July 17, 1951      E. R. OLSEN      2,560,775

PISTON RING

Filed May 5, 1948

INVENTOR.
Ernest R. Olsen
BY
Attorney.

Patented July 17, 1951

2,560,775

UNITED STATES PATENT OFFICE 2,560,775

PISTON RING

Ernest R. Olsen, Muskegon, Mich., assignor to Hastings Manufacturing Company, Hastings, Mich., a corporation of Michigan Application May 5, 1948, Serial No. 25,195

16 Claims. (Cl. 309—44)

1

This invention relates to improvements in piston or packing rings.

The main objects of this invention are:

First, to provide a split expansible resilient cast iron piston ring of the canted type which is very durable in use.

Second, to provide a split expansible resilient piston ring having a restricted wear resisting cylinder wall engaging portion subject to relatively high unit pressure.

Third, to provide a split expansible resilient piston ring in which the lower side is hardened throughout the radial width thereof providing a hardened wear resisting surface coacting with the bottom wall of a piston ring groove in which the piston ring is installed and a relatively restricted peripheral cylinder wall engaging portion, the remainder of the ring being unhardened, whereby in use it tends to provide and maintain an upwardly tapered outer periphery portion above the hardened portion of the ring.

Fourth, to provide a split expansible cast iron piston ring having increased tensile strength and resilience as compared to cast iron piston rings now in general use.

Fifth, to provide a split expansible piston ring of the canted type which requires no machining to produce the cant.

Sixth, to provide a split expansible piston ring having increased efficiency and increased durability which is economical to produce.

Objects pertaining to details and economies of the invention will definitely appear from the description to follow. The invention is defined in the claims.

A piston ring which embodies the features of the invention is clearly illustrated in the accompanying drawing, in which.

2

Figure 6:
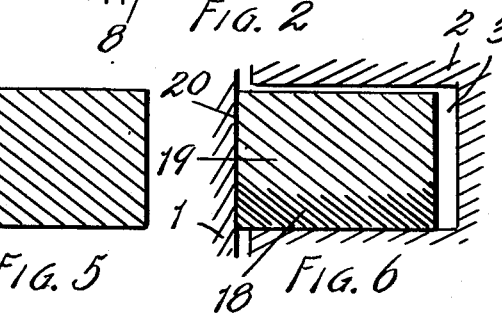

Fig. 6 is a fragmentary sectional view illustrating one embodiment of my invention as initially installed in a piston ring groove and prior to its becoming worn.

Figure 7:
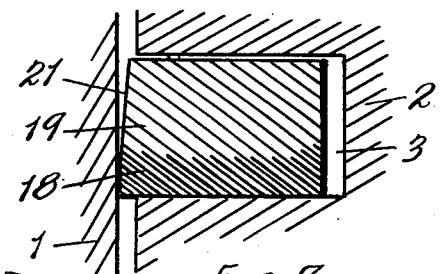
Figure 12:
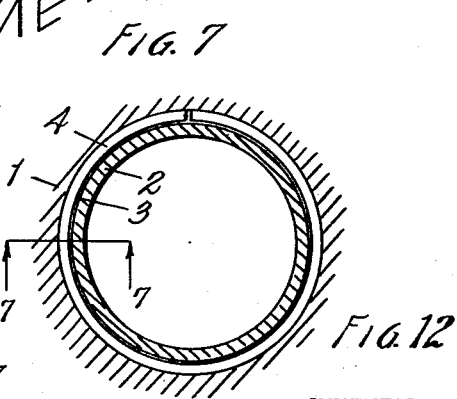

Fig. 7 is a fragmentary sectional view of the piston ring of Fig. 6 taken on a line corresponding to line 7—7 of Fig. 12 after it has become worn or after the wearing-in period.

Figure 8:
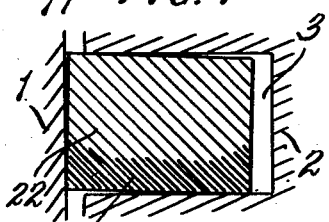

Fig. 8 is a fragmentary sectional view of Figs. 1, 2, 6 and 7 illustrating the ring of my invention in which the canting of the ring is the result of the hardening of a portion of the ring.

Figure 9:
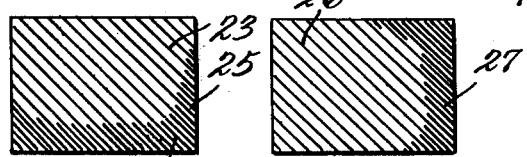

Fig. 9 is a fragmentary sectional view of a ring of the embodiment of my invention in which the hardening extends into the inner peripheral side of the ring.

Figure 10:
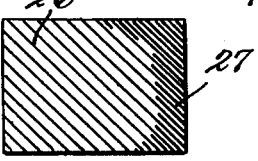

Fig. 10 is a fragmentary sectional view of a further modification or embodiment of my invention in which the inner peripheral side of the ring is hardened to increase the tensile strength and resilience of the ring.

Figure 11:
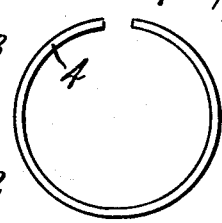

Fig. 11 is a side elevational view of a piston ring of my invention in its expanded form, the illustration being conventional.

Fig. 12 is a fragmentary horizontal section through a cylinder and piston with the ring of my invention as shown in Fig. 7 in collapsed installed position.

I desire to point out that in the accompanying drawings no attempt has been made to show the parts in proper proportions and with the proper clearances and tolerances, the drawings being intended to be illustrative and pictorial in character. I am aware that piston rings of the canted type possess certain advantages both as to sealing and oil control not possessed by rings in which the full outer peripheral surface is presented to the cylinder wall. An example of a ring of the canted type is shown in the Phillips Patent No. 2,387,854, October 30, 1945. Such rings, while efficient during the early use thereof, are subject to excessive wear, owing to the presentation of a relatively restricted wear surface to the cylinder.

It is one of the main objects of my invention to provide a piston ring having the advantages of a canted piston ring, or one with restricted cylinder wall engaging area, which at the same time is very durable and long lasting, and maintains its efficiency for a long period of time.

Figure 1:
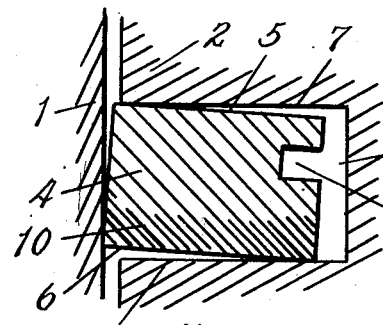
Fig. 1 is a fragmentary enlarged sectional view of a canted type of piston ring embodying my invention.

Referring to the drawings, I represents a cylinder, 2 a piston operatively associated therewith and having a groove 3. The piston ring 4 of my invention in the embodiment illustrated in Fig. 1 is of rectangular section having parallel top and bottom sides 5 and 6, respectively, adapted to coact with the top and bottom walls 7 and 8 of the piston ring groove. As stated, no attempt has been made to show parts in their proper proportions and clearances, these being engineering factors and understood in the art.

Figure 2:
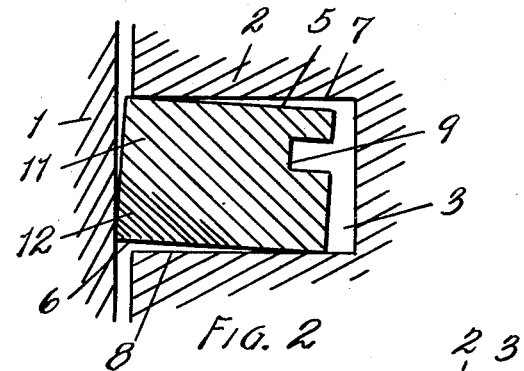
Fig. 2 is a similar view of a modified form or embodiment of my invention.

My invention is particularly well adapted for embodiment in piston rings of the canted type although certain features of the invention have advantages in rings other than canted rings. In Figs. 1 and 2 I illustrate piston rings of the canted type shown in the Phillips patent above referred to in which the rings designated 4 in Fig. 1 and 11 in Fig. 2 are provided with continuous annular grooves 9 cut in their inner peripheral edges, these grooves being spaced from the upper sides 5 of the rings but located above the axial center thereof. These rings 4 and 11 are preferably formed of cast iron.

Referring particularly to the structure shown in Fig. 1, the ring 4 has its lower side hardened as indicated at 10 to a substantial depth, approximately one-third of the axial thickness of the ring. This hardening is accomplished by heating to the desired temperature and depth and promptly cooling. However, the hardening may extend to approximately one-half the axial width of the ring, although I prefer the lesser depth. The depth of hardening may be of the order of one-fifth to one-half the thickness of the ring with desirable results.

In the embodiment shown in Fig. 1 this hardening extends the full radial width of the ring and provides a hardened wear surface for the under side of the ring and a hardened cylinder peripheral surface providing a restricted cylinder wall engaging surface which is initially a sharp edge when the ring is preliminarily canted.

The hardening may be accomplished by heat treatment, as for example either by flame heating or induction heating, but it should be quenched promptly when the desired temperature is reached and a desired depth. A hardening of the order of 105/115 Rockwell is considered desirable. The remainder of the ring is not hardened and remains in its initial condition prior to hardening so that the ring retains its springability and resilience. High unit cylinder wall pressure results owing to the restricted cylinder wall engaging area. This hardening results in a substantial canting of the ring, even where the ring is not previously canted as by forming the grooves 9 therein. When the ring is compressed in the ring groove the hardened side 10 resists bending a considerable more than the soft side, which results in canting of the ring in the ring groove. Changing one side of the ring to high tensile material will nearly double the tensile strength of the area, and will cause the resistance to bending when the ring is compressed in a piston ring groove to about double, thus the soft part of the ring will bend easily and the hardened part will resist bending, throwing the ring immediately into a distorted position or into a so-called twisted or canted position. The hardening also increases the tensile strength of the ring and its resilience, which adds to the high unit cylinder wall pressure. In the embodiment shown in Fig. 2 only the outer lower corner of the ring is hardened as indicated at 12. This ring presents a restricted hardened wear surface to the cylinder and the ring is desirably of the canted type, that is, canted in addition to such canting as may result from the hardening.

Figure 3:
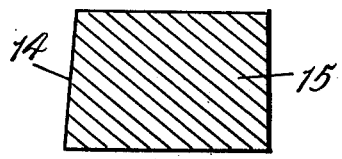
Fig. 3 is a cross section of a partially formed piston ring of my invention illustrating one of the steps in producing one embodiment of my invention.
Figure 5:
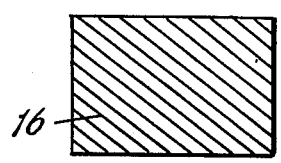
Fig. 5 is a cross sectional view of a piston ring prior to the hardening of a portion thereof, illustrating one of the steps in the production of the ring shown in Figs. 6 and 7.
Figure 4:
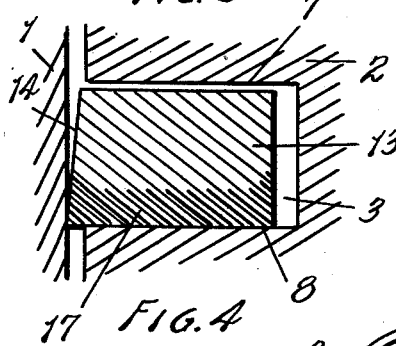
Fig. 4 is a fragmentary section similar to Figs. 1 and 2 of a piston ring embodying one form of my invention formed or produced by steps including that shown in Fig. 3.

In Figs. 3 and 4 I illustrate another embodiment of my invention and method of producing the same. In that embodiment the ring 13 has an upwardly tapered peripheral surface 14 which is machined on the ring element 15. This ring element is originally formed as shown in Fig. 5 and indicated by the numeral 16. It is of rectangular section, the taper 14 being produced by machining. This machined element of Fig. 3 is hardened as indicated at 17, the hardened portion being the same as shown at 10 in Fig. 1. The embodiment of Fig. 4 is also highly efficient and can be produced somewhat more economically than Fig. 1, inasmuch as the outer peripheral machining to secure the taper is somewhat simpler than forming the kerf or groove 9 in the inner periphery.

In the embodiment shown in Figs. 6 and 7 the ring element 18 is hardened on its under side as indicated at 18 to produce the ring 19. When this ring is installed in the piston its unhardened peripheral portion 20 wears away to a tapered condition as indicated at 21 in Fig. 7.

In Fig. 8 the canting resulting from the heat or hardening treatment is indicated but in use the wear on the unhardened portion will produce an upward taper to the outer periphery of the ring 22.

In the embodiment shown in Fig. 9 the ring 23 has its lower side 24 and a portion of its inner periphery hardened as indicated at 25.

In the embodiment of Fig. 10 the inner periphery of the ring 26 is hardened at 27 primarily for the purpose of increasing the tensile strength and resilience of the ring while maintaining the wear characteristics of the metal from which the ring is formed, such as cast iron for example, which may be of a character to provide lubricating qualities or characteristics.

In all of these embodiments except that of Fig. 10 a restricted wear resisting cylinder wall engaging portion is provided, and this is attained with a substantial increase in tensile strength and resilience.

While there are advantages in embodying my invention in a canted ring such as shown in Figs. 1 and 2, the hardening tends to cant the ring and this provides the wear characteristics resulting from a restricted wear resisting peripheral portion and results in the advantages of a canted ring with very high wear resisting characteristics.

The ring of my invention possesses all of the advantages of the canted or scraper edge ring without the disadvantages of rapid wear, at the same time maintaining the high cylinder wall unit pressure, and this with slightly additional cost to manufacture over the commercially used types of cast iron piston rings.

I have illustrated and described my invention in highly practical embodiments thereof, both from the manufacturing standpoint and the standpoint of use. I have not attempted to illustrate or describe various other adaptations which I contemplate as it is believed this disclosure will enable those skilled in the art to embody or adapt my invention as desired.

Having thus described my invention, what I claim as new and desire to secure by Letters Patent is:

1. A split expansible resilient piston ring of uniform axial thickness and having parallel top and bottom sides of uniform radial width, said ring having a continuous kerf or slot cut in the inner periphery thereof above its axial center but in substantially spaced relation to its upper side whereby the ring assumed an upward cant when compressed in a piston ring groove, the lower side of the ring being hardened to a substantial depth throughout the full radial width thereof, thereby providing a hardened wear surface coacting with the lower wall of a piston ring groove in which the piston ring is installed and a wear resisting cylinder wall contacting edge projecting radially beyond the unhardened peripheral portion of the ring.

2. A split expansible resilient piston ring of ferrous metal having parallel flat sides initially of the full radial width of the ring, the lower side of the ring to the outer peripheral edge being hardened by heat treatment to a depth of the order of ⅕ to ½ of the axial thickness of the ring, the upper side to the outer peripheral edge being relatively soft as compared to the lower side whereby as a result of wear, the unhardened peripheral portion of the ring wears to a downwardly tapered conformation so that substantially only the hardened portion of the ring is presented to a cylinder wall, the greater resistance to bending of the lower hardened portion of the ring than that of the softer upper portion canting the ring under compression in the ring groove.

3. A split expansible resilient piston ring of ferrous metal having an upwardly tapering outer periphery presenting a restricted cylinder wall engaging portion at its lower side, the lower side of the ring to the outer peripheral edge being hardened by heat treatment in the order of 105/115 Rockwell throughout the full radial width thereof, the lower side of the ring to the outer peripheral edge being relatively soft as compared to the upper side, whereby the lower side of the ring presents a wear resisting surface to the lower wall of a piston ring groove in which the ring is installed and a restricted wear resisting cylinder wall engaging portion, the greater resistance to bending of the lower hardened portion than that of the softer upper portion facilitating a canting-like action of the ring under compression in the ring groove.

4. A split expansible resilient piston ring of ferrous metal having, an upward cant when compressed in a piston ring groove, the lower side of the ring being hardened by heat treatment to a substantial depth throughout the full radial width thereof, the remainder of the ring being unhardened, thereby providing a hardened wear surface coacting with the lower wall of a piston ring groove in which the piston ring is installed and a wear resisting cylinder wall engaging portion projecting radially beyond the unhardened peripheral portion of the ring.

5. A split expansible resilient piston ring of cast iron having, a cant when compressed in a piston ring groove, the peripherally projecting portion resulting from the cant being hardened by heat treatment to a substantial depth providing a restricted wear resisting cylinder wall contacting portions projecting radially beyond the unhardened peripheral portion of the ring.

6. A split expansible resilient piston ring of ferrous metal, the lower side of the ring being hardened by heat treatment to a substantial depth throughout the full radial width thereof, the remainder of the ring being unhardened, thereby providing a hardened wear surface coacting with the lower wall of a piston ring groove in which the piston ring is installed and a wear resisting cylinder wall engaging portion.

7. A split expansible resilient piston ring of ferrous metal having a peripheral corner portion hardened by heat treatment to a substantial depth providing a restricted wear resisting cylinder wall contacting portion projecting radially beyond the unhardened peripheral portion of the ring.

8. A split expansible piston ring of ferrous metal canted upwardly and having the peripherally projecting cylinder engaging portion thereof hardened by heat treatment to the order of 105 to 115 Rockwell.

9. A split expansible piston ring element of ferrous metal canted upwardly having the lower side thereof hardened by heat treatment to a depth of approximately one-third the axial thickness of the ring, the hardened portion extending to the external periphery of the ring, the rest of the external peripheral portion of the ring being unhardened.

10. A split expansible piston ring of ferrous metal having at least one outer peripheral corner thereof hardened by heat treatment to provide a wear resisting cylinder wall engaging portion, the remaining portion of the outer peripheral surface being relatively soft permitting relatively rapid wear thereof during the initial period of operation of the ring, whereby thereafter the radial thrust to the ring and the cylinder wear thereon is maintained by the hardened peripheral portion of the ring.

11. A split expansible piston ring element of ferrous metal having the lower side thereof hardened by heat treatment to a depth of the order of one-fifth to one-half the axial thickness of the ring, the hardened portion extending to the external periphery of the ring, the remainder of the external peripheral portion of the ring being unhardened.

12. A split expansible cast iron piston ring element having upper and lower sides for engaging the upper and lower side walls of a piston ring groove, one only of said sides being hardened, said side being hardened to a substantial depth subsequent to the casting and machining of the ring whereby the ring is canted and its tensile strength is increased as compared to the element prior to hardening, said side being hardened by heat treatment.

13. A split expansible piston ring element of ferrous metal having the lower side and a substantial portion of the inner peripheral side thereof hardened by heat treatment to a substantial depth, the hardened portion of the lower side thereof extending to the external periphery of the ring, the remainder of the external peripheral portion of the ring being unhardened.

14. A split expansible piston ring element of cast iron having upper and lower sides for engaging the upper and lower side walls of a piston ring groove, one only of said sides being hardened to a substantial depth by heating and quenching, the greater resistance to bending of the hardened side of the ring than that of the other side when the ring is under compression in the ring groove canting the ring in the ring groove.

15. A split expansible piston ring element of ferrous metal having upper and lower side walls, said ring element having one portion thereof hardened by heating and quenching thereby increasing its wear resistance as compared to the remainder of the external periphery of the ring, said hardened portion including only one of the external peripheral corners of the ring.

16. A split expansible piston ring of cast iron having at least one surface portion thereof hardened to a substantial depth by heating and quenching, thereby increasing the tensile strength and resilience of the ring the hardened surface portion including only the lower portion of the ring, the remainder of the ring being unhardened, the greater resistance to bending of the hardened side of the ring than that of the other side when the ring is under compression in the ring groove canting the ring in the ring groove.

ERNEST R. OLSEN.

REFERENCES CITED

The following references are of record in the file of this patent:

UNITED STATES PATENTS

| Number | Name | Date |
|---|---|---|
| 2,125,606 | Deeb | Aug. 2, 1938 |
| 2,280,552 | Somes | Apr. 21, 1942 |
| 2,387,855 | Phillips | Oct. 30, 1945 |
| 2,404,616 | Bramberry | July 23, 1946 |
| 2,488,697 | Ackerman | Nov. 22, 1949 |

FOREIGN PATENTS

| Number | Country | Date |
|---|---|---|
| 214,969 | Great Britain | Jan. 15, 1925 |